United States Patent
Senninger et al.

[11] Patent Number: 5,854,364
[45] Date of Patent: Dec. 29, 1998

[54] PROCESS FOR THE CONTROLLED RADICAL POLYMERIZATION OR COPOLYMERIZATION OF (METH) ACRYLIC, VINYL, VINYLIDENE AND DIENE MONOMERS, AND (CO)POLYMERS OBTAINED

[75] Inventors: Thierry Senninger, Hayange; Laurent Sanchez, Pau; Vincent Darcos, St. Loubert; Dominique Lastecoueres, St. Radegonde; Jean-Baptiste Verlhac, Talence, all of France

[73] Assignee: Elf Atochem S.A., France

[21] Appl. No.: 884,087

[22] Filed: Jun. 27, 1997

[30] Foreign Application Priority Data

Dec. 26, 1996 [FR] France ................... 96 16049

[51] Int. Cl.$^6$ .............. C08F 4/44; C08F 20/10; C08F 12/08; C08F 14/06; C08F 36/00; C08F 14/18

[52] U.S. Cl. .......... 526/192; 526/217; 526/328; 526/346; 526/335; 526/344; 526/242

[58] Field of Search .................. 526/192, 217, 526/242, 328, 335, 344, 346

[56] References Cited

U.S. PATENT DOCUMENTS 5,405,913  4/1995  Harwood et al. ................ 525/245
5,708,102  1/1998  Fryd et al. ...................... 526/172

OTHER PUBLICATIONS

Wang et al., "Controlled/'Living' Radical Polymerization. Halogen Atom Transfer Radical Polymerization Promoted by a Cu(I)Cu(II) Redox Process", *Macromolecules*, 28:7901–7910, 1995.

Primary Examiner—Jeffrey Smith
Assistant Examiner—Wu C. Cheng
Attorney, Agent, or Firm—Millen, White, Zelano, & Branigan, P.C.

[57] ABSTRACT

At least one of the monomers is polymerized or copolymerized in bulk, solution, emulsion or suspension, at a temperature which may be as low as 0° C., in the presence of at least one radical-generator compound and at least one metal complex catalyst of formula $Ma_a(L)_n$ (M=Cu, Ag or Au; A=Hal, pseudohalogen or carboxylate; L=ligands of M chosen from those of formula

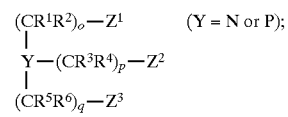

(Y = N or P);

$R^1$, $R^2$, $R^3$, $R^4$, $R^5$ and $R^6$=H, $C_1$–$C_{10}$ alkyl, aromatic or heteroaromatic; $Z^1$, $Z^2$ and $Z^3$=one of the following:

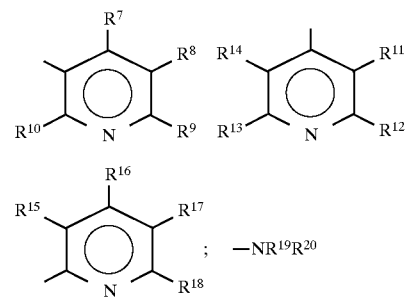

($R^7$ to $R^{18}$=H, $C_1$–$C_{10}$ alkyl, aromatic or heteroaromatic; $R^{19}$ and $R^{20}$=H, Hal, $C_1$–$C_{10}$ alkyl, $C_1$–$C_{10}$ alkoxy or —$(CR^{21}R^{22})rNR^{23}R^{24}$, where $R^{21}$, $R^{22}$, $R^{23}$ and $R^{24}$=H, $C_1$–$C_{10}$ alkyl, aromatic or heteroaromatic, and r=integer from 1 to 10; it being possible also for not more than two from among $Z^1$, $Z^2$ and $Z^3$ each to represent H; o, p and q=integer from 1 to 10 and may also be 0 except if the associated residue $Z^1$, $Z^2$ or $Z^3$, respectively, is —$NR^{19}R^{20}$; a=1 or 2; n=1, 2 or 3.

20 Claims, No Drawings

PROCESS FOR THE CONTROLLED RADICAL POLYMERIZATION OR COPOLYMERIZATION OF (METH) ACRYLIC, VINYL, VINYLIDENE AND DIENE MONOMERS, AND (CO)POLYMERS OBTAINED

CROSS-REFERENCE TO RELATED APPLICATIONS

This application is related to commonly assigned concurrently filed applications entitled: Process for the Controlled Radical (Co)Polymerization of (Meth)Acrylic and Vinyl Monomers in the Presence of an Fe, Ru or Os Complex and (Co)Polymers Obtained (Attorney Docket No. CHAIL 21), based on French Application No. 96/10634 filed Aug. 30, 1996, by Thierry SENNINGER et al.; Process for the Controlled Radical Polymerization or Copolymerization of (Meth)Acrylic and Vinyl Monomers, and (Co)Polymers Obtained (Attorney Docket No. CHAIL 22), based on French Application No. 96/10125 filed Aug. 12, 1996, by Thierry SENNINGER et al.; and Process for the Controlled Radical (Co)Polymerization of (Meth)Acrylic, Vinyl, Vinylidene and Diene Monomers in the Presence of an Rh, Co, CO or Ir Complex (Attorney Docket No. CHAIL 24), based on French Application No. 96/13571, by Philippe DUBOIS et al.

FIELD OF THE INVENTION

The present invention relates to a process for the controlled radical polymerization or copolymerization of (meth) acrylic and/or vinyl (for example vinylaromatic) and/or vinylidene and/or diene monomers, as well as to the polymers or copolymers thus obtained.

BACKGROUND OF THE INVENTION

Radical polymerization constitutes one of the polymerization processes which is most frequently exploited industrially on account of the variety of polymerizable monomers, the ease of implementation and the ease of the synthetic processes employed (bulk, emulsion, solution or suspension polymerization). However, it is difficult in standard radical polymerization to control the polymer chain size and the molecular mass distribution. Materials consisting of these macromolecules thus do not have controlled physiochemical properties. Furthermore, standard radical polymerization does not lead to block copolymers.

Ionic or coordinative polymerizations make it possible themselves to control the process of addition of the monomer, but they require careful polymerization conditions, in particular a high level of purity of the monomer and of the reactants, as well as an inert atmosphere.

The aim is to be able to carry out radical polymerizations which afford better control over the various parameters mentioned above and which can lead to block copolymers.

The concept used for controlling the polymerization involves redox reactions for transferring atoms or groups of atoms reversibly. The metal complex oscillates between two oxidation states. This concept was exploited by Sawamoto and Matyjaszewski for the polymerization of vinyl monomers.

Sawamoto (Macromolecules 1996, 29(3), 1070 and Macromolecules 1995, 28(5), 1721) used ruthenium (II) complexes combined with an alkyl halide, for example $RuCl_2(PPh_3)_3$. Such a system requires the addition of a Lewis acid which increases the rate of polymerization by complexing the acid onto the carbonyl functions of the rowing chains.

Matyjaszewski (Macromolecules 1995, 28(23), 7901) exploits the same concept with copper complexes combined with bidentate ligands of bipyridine type:

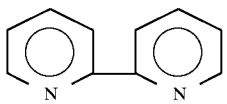

To do this, a copper (I) salt such as CuCl or CuBr is mixed with the nitrogen-containing ligand in a Cu:ligand molar ratio=1:3.

The nitrogen-containing ligand has an important role in the polymerization since it makes it possible to modify the stereoelectronic properties of the metal and dissolve the copper (I) salt. Thus, it is necessary, in order to achieve complete solubilization of the copper complex in the monomer or in the monomer/polymerization solvent mixture, to use bipyridines substituted para to the nitrogen with lipophilic groups, such as dinonylbipyridine:

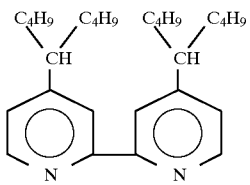

This solubilization increases the performance of the polymerization system by virtue of a better contact between the "sleeping" growing chain, that is to say the chain terminated with a function A as defined below, and the coordination complex.

SUMMARY OF THE INVENTION

The aim of the present invention is to propose an initiator system which uses, for the catalyst, another variety of polydentate ligands which may advantageously replace the bipyridine or the substituted bipyridines, and which makes it possible to obtain polymerization rates, and thus productivities, that are higher than those of bipyridines.

The aim of the present invention is achieved by a process for the controlled radical polymerization or copolymerization of (meth)acrylic and/or vinyl monomers, characterized in that at least one of the said monomers is polymerized or copolymerized in bulk, solution, emulsion or suspension at a temperature which may be as low as 0° C., in the presence of an initiator system comprising:

at least one radical-generator compound; and at least one catalyst consisting essentially of a metal complex represented by formula (I) below:

$$MA_a(L)_n \qquad (I)$$

in which:

M represents Cu, Ag or Au;

A represents a halogen, a pseudo halogen or a carboxylate group;

the groups L are ligands of the metal M which are chosen independently from those represented by formula (II) below:

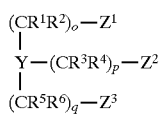

$$\begin{array}{c} (CR^1R^2)_o-Z^1 \\ | \\ Y-(CR^3R^4)_p-Z^2 \\ | \\ (CR^5R^6)_q-Z^3 \end{array} \qquad \text{(II)}$$

in which:

Y represents N or P;

$R^1$, $R^2$, $R^3$, $R^4$, $R^5$ and $R^6$ each independently represent a hydrogen atom, a $C_1$–$C_{10}$ alkyl group, an aromatic group or a heteroaromatic group;

$Z^1$, $Z^2$ and $Z^3$ each independently represent one of the following:

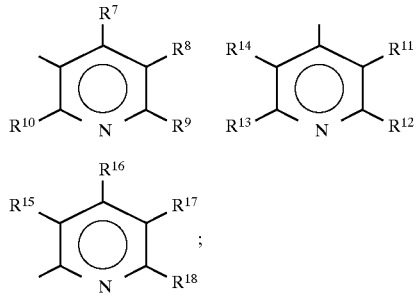

—$NR^{19}R^{20}$ where:

the radicals $R^7$ to $R^{18}$ each independently represent a hydrogen atom, a $C_1$–$C_{10}$ alkyl group, an aromatic group or a heteroaromatic group; and $R^{19}$ and $R^{20}$ each independently represent a hydrogen atom, a halogen atom, a $C_1$–$C_{10}$ alkyl radical, a $C_1$–$C_{10}$ alkoxy radical or a radical —$(CR^{21}R^{22})_rNR^{23}R^{24}$, where $R^{21}$, $R^{22}$, $R^{23}$ and $R^{24}$ each independently represent a hydrogen atom, a $C_1$–$C_{10}$ alkyl group, an aromatic group or a heteroaromatic group, and r is an integer from 1 to 10;

it being also possible for not more than two from among $Z^1$, $Z^2$ and $Z^3$ each to represent a hydrogen atom;

o, p and q each independently represent an integer from 1 to 10, and may also represent 0 except if the associated residue $Z^1$, $Z^2$ or $Z^3$, respectively, represents —$NR^{19}R^{20}$;

a is 1 or 2;

n is 1, 2 or 3.

M preferably represents Cu.

A represents a halogen chosen in particular from Cl, Br, F and I, or a pseudohalogen chosen in particular from CN, NCS, $NO_2$ and $N_3$, or a carboxylate group such as acetate.

Examples of ligands L which may be mentioned are those of formula (IIa):

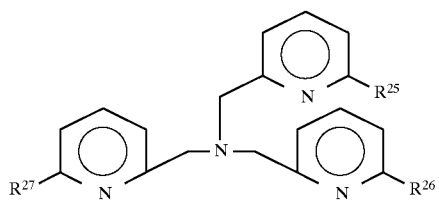

with

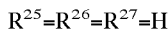
$R^{25}=R^{26}=R^{27}=H$
$R^{25}=H$ ; and $R^{26}=R^{27}=Me$
$R^{25}R^{26}=R^{27}=Me$;

and the compounds of formulae:

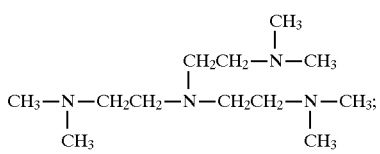

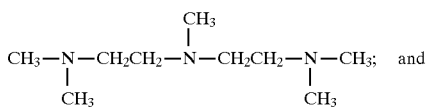

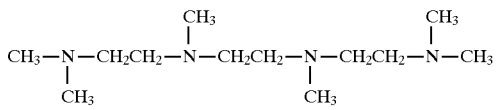

The complex of the invention may be prepared and purified ex situ before being added to the polymerization medium, or may be formed directly in the polymerization medium in contact with the monomer and the polymerization solvent. In this latter case, it will suffice to combine the transition metal salt M (Cu, Ag or Au) with A and the polydentate ligand L in the desired amount. Examples of transition metal salts which may preferably be mentioned are CuBr, CuCl and copper (I) acetate (CuOAc).

Since the catalyst does not act as a radical generator, it is thus essential to combine it with such a compound. The reaction between the radical generator and the metal species M described above gives rise to a controlled polymerization. A polymerization may thus be continued by adding a fresh dose of a monomer, which may be different from the first. If this monomer is different from the first, and if it is added after the first has been consumed (or up to a high conversion of about 80–100%, preferably 95%), a block copolymer will be obtained. If it is added at the same time as the first, the copolymerization will be random and a random copolymer will be obtained. For the preparation of block copolymers, it may be envisaged to use a mixture of two or more catalysts, the second dose of monomer being added in the presence of a different catalyst but still of the type as defined in the context of the present invention, this catalyst then needing to be more active than the one already present. This operation may be repeated in this way at each new sequence which it is desired to prepare.

According to the invention, radical-generator compounds that are particularly suitable are halo compounds activated by electron-donating and/or electron-withdrawing effects on the carbon atom in the position α to the halogen or halogens of the said compound, in particular those indicated below:

when the radical generator is monofunctional, it may be chosen from the following classes of compounds:

(a) derivatives of formula:

$$CEZ_3$$

where:

E=Cl, Br, I, F, H, —$CR^{28}R^{29}OH$, $R^{28}$ and $R^{29}$ each independently representing hydrogen or $C_1$–$C_4$ alkyl; and Z=Cl or Br, for example, carbon tetrachloride, chloroform, carbon tetrabromide, 2,2,2-tribromoethanol and bromotrichloromethane;

(b) derivatives of formula:

$$R^{30}CCl_3$$

where $R^{30}$ represents a phenyl group; benzyl group; benzoyl group; alkoxycarbonyl group; group $R^{31}CO$ with $R^{31}$ representing $C_1-C_{14}$ alkyl or aryl; alkyl group; mesityl group; trifluoromethyl group; or nitro group, such as, for example, α,α,α-trichlorotoluene, α,α,α-trichloroacetophenone, ethyl trichloroacetate, 1,1,1-trichloroethane, 1,1,1-trichloro-2-phenylethane, trichloromethylmesitylene, 1,1,1-trichloro-2,2,2-trifluoroethane and trichloronitromethane;

(c) derivatives of formula:

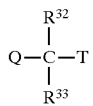

in which:

Q represents a chlorine or bromine atom or an acetate

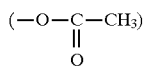

or trifluoroacetate

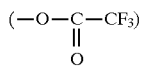

or triflate ($O_3SCF_3$) group;

$R^{32}$ represents a hydrogen atom, a $C_1-C_{14}$ alkyl group or an aromatic group of the benzene, anthracene or naphthalene type, for example, or a —$CH_2OH$ group;

T represents a group

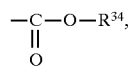

with $R^{34}$ each representing hydrogen or an alkyl or aromatic group; a CN group; a group

with R representing $C_1-C_{14}$ alkyl, phenyl or isocyanate; a hydroxyl group; a nitro group; a substituted or unsubstituted amino group; a $C_1-C_{14}$ alkoxy group; a group $R^{36}CO$, with $R^{36}$ representing $C_1-C_{14}$ alkyl or aryl;

$R^{33}$ represents a group falling within the definitions of $R^{32}$ or of Q or a functional group such as hydroxyl, nitro, substituted or unsubstituted amino, $C_1-C_{14}$ alkoxy, acyl, carboxylic acid or ester;

such as, for example, 2-bromopropionic acid, 2-bromobutanoic acid, 2-bromohexanoic acid, ethyl 2-bromo-2-methylpropionate, bromoacetonitrile, 2-bromopropionitrile, 2-bromoisobutyrophenone and chloroacetyl isocyanate; 2-bromo-2-nitro-1,3-propanediol and 2-bromo-2-nitropropane;

(d) α-halo lactone or lactam compounds such as α-bromo-α-methyl-γ-butyrolactone or α-bromo-γ-valerolactone, halogenated lauryllactam or halogenated caprolactam;

(e) N-halosuccinimides, such as N-bromosuccinimide, and N-halophthalimides, such as N-bromophthalimide;

(f) alkylsulphonyl halides (chlorides and bromides), the alkyl residue being $C_1-C_{14}$ in particular, and arenesulphonyl halides such as those of formula:

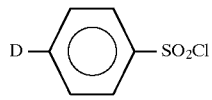

where D=Me, Cl, OMe, $NO_2$;

(g) compounds of formula:

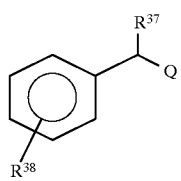

where:

$R^{37}$ represents a hydrogen atom, a $C_1-C_{14}$ alkyl group or a carboxylic acid, ester, nitrile or ketone group;

$R^{38}$ represents a hydrogen atom or a $C_1-C_{14}$ alkyl, hydroxyl, acyl, substituted or unsubstituted amine, nitro, $C_1-C_{14}$ alkoxy or sulphonate ($SO_3^-Na^+$ or $K^+$) group; and Q has the meaning given above;

examples being (1-bromoethyl)benzene and (1-chloroethyl)benzene;

(h) compounds of formula:

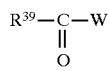

where:

$R^{39}$ represents $C_1-C_{14}$ alkyl or aryl; and

W represents a halogen, preferably Cl and Br, or a pseudohalogen such as $N_3$ or SCN;

(i) compounds of formula:

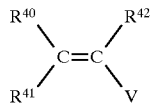

where:

$R^{40}$, $R^{41}$ and $R^{42}$ each independently represent $C_1-C_{14}$ alkyl or aryl; and V represents a halogen, preferably such as Cl or Br, or also an acetate, trifluoroacetate or triflate group; and (j) aromatic halides of formula:

where:

Ar represents an aromatic group such as $C_6H_5$— which may be substituted in the meta, ortho or para position with an electron-withdrawing group, such as $NO_2$, $NO_3$ or $SO_3$, or an electron-donating group, such as an alkyl group or an —ONa group; and U represents a halogen, preferably such as Cl or Br.

It may also be envisaged to use difunctional radical generators and generators of higher functionality; the difunctional radical generators may consist of two monofunctional radical generators $A^1$ and $A^2$ derived from the abovementioned classes (c) to (j), connected by a chain of methylene units or by a benzene ring or by a combination of the two, as represented by the formulae:

with s being an integer from 1 to 14,

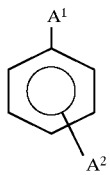

and

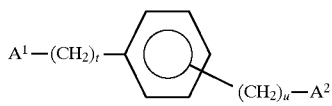

with t and u each independently representing an integer from 1 to 14.

In the case where $A^1$ and $A^2$ are derived from the class (c), the difunctional radical generators may be represented by the formula:

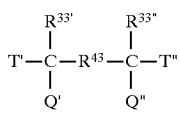

in which:

T' and T" each independently represent a group falling within the definition of T;

Q' and Q" each independently represent a group falling within the definition of Q;

$R^{33'}$ and $R^{33"}$ each independently represent a group falling within the definition of $R^{33}$; and $R^{43}$ represents a group $-(CH_2)_s-$,

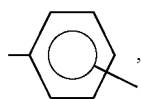

or

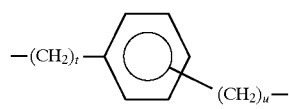

as defined above.

Mention may be made, for example, of the difunctional initiators of formulae:

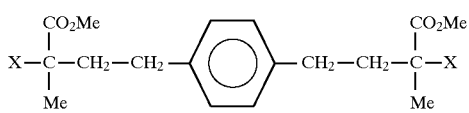

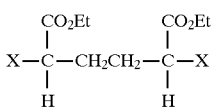

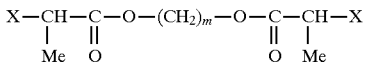

with X=halogen, such as Br and Cl; and m=integer from 1 to 10.

The use of a difunctional initiator allows the preparation of triblock copolymers of A(b)B(b)A type, by firstly synthesizing the central difunctional block, which serves to initiate the polymerization of the monomer A.

The multifunctional radical-generator compounds may consist of at least three monofunctional radical-generator groups $A^1$, $A^2$ and $A^3$ derived from the abovementioned classes (c) to (j) connected together by a benzene ring, such as, for example, those corresponding to the formula:

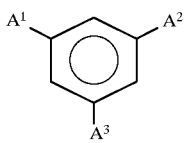

Other difunctional radical-generator compounds are tri- or tetrahalomethanes and trichloromethyl derivatives of the abovementioned classes (a) and (b), it also being possible for these same tri- and tetrahalomethanes to serve as multifunctional radical-generator compounds.

Difunctional radical-generator compounds other than those represented above may also be used, in particular those of the acetic anhydride family such as chloroacetic anhydride and chlorodifluoroacetic anhydride.

Another means of initiating the polymerization consists in initiating it using radical initiators that are commonly used in radical polymerization. Thus, the families of initiators which may be used may be the following:

azo compounds, such as 2,2'-azobis(2-methyl) propanenitrile (or AIBN), 1,1'-azobis(1-cyclohexanenitrile) and 4,4'-azobis(4-cyanovaleric acid);

peroxy compounds, such as diacyl peroxides, such as dibenzoyl peroxide and didodecanoyl peroxide;

dialkyl peroxides, such as di-tert-butyl peroxide and diisopropyl peroxide;

dicumyl peroxide;

peroxy-dicarbonates;

peresters such as tert-butyl peracetate, tert-amyl perpivalate, butyl per-2-ethylhexanoate, tert-butyl perpivalate and tert-butyl perbenzoate;

hydroperoxides such as tert-butyl hydroperoxide;

inorganic peroxides such as aqueous hydrogen peroxide solution; and sodium or potassium persulphate.

The radical initiator may be introduced into the reaction medium in a proportion of 10–100,000 ppm by weight based on the polymerizable monomer or monomers. Preferably, the complex of formula (I) which serves to control the polymerization will then be such that a=2.

The polymerization according to the invention may also be carried out in the presence of an activator chosen, in particular, from Lewis acids such as aluminium alkoxides, for example $Al(OiPr)_3$.

Since the polymer chain length is determined beforehand by the molar ratio of the (meth)acrylic or vinyl or vinylidene or diene monomer or monomers to the radical-generator compound or compounds, this ratio is from 1 to 100,000, advantageously from 50 to 2,000. As regards the molar ratio of the metal M to the radical generator(s), it is generally between 0.01 and 100, advantageously between 0.1 and 20. The molar ratio L:M in the case where the complex (I) is formed in situ may be between 0.1 and 10, preferably between 0.5 and 2.

Since the concentration of active centres is constant throughout the polymerization or copolymerization reaction on account of the absence of termination reactions, the large and violent exothermicity (or Trommsdorf effect) of standard radical polymerizations does not occur in the case of the present invention. For the industrial process, this clearly constitutes important progress since polymerizations or copolymerizations carried out under these conditions no longer risk running totally out of control. In general, the polymerization or copolymerization will be carried out at a temperature of from 0° C. to 130° C., advantageously between 40° and 90° C., without any loss of activity of the catalyst.

Since the initiator systems according to the invention are compatible with water, the polymerization or copolymerization reactions may thus be carried out in aqueous medium, in the presence or absence of emulsifiers. Accordingly, the polymerizations in aqueous medium are carried out either in suspension (water-insoluble radical-generator compound) or in emulsion (water-soluble radical-generator compound) in the presence of emulsifiers. The emulsifiers may be anionic surfactants, such as sodium dodecylbenzenesulphonate, sodium dodecyl sulphate, sodium lauryl sulphate and mixtures thereof, or of the neutral type, such as glycol esters, esters of sorbitan and of polyethylene glycol, such as the monolaurate, monopalmitate, oleate and stearate of sorbitan and of polyethylene glycol, fatty acid esters of polyethylene glycol such as polyethylene glycol stearate, and fatty alcohol ethers of polyethylene glycol such as the stearyl and cetyl ethers of polyethylene glycol.

When they are carried out in solution, the polymerization or copolymerization reactions of the invention may, obviously, also be carried out in the presence of an organic solvent or a mixture of organic solvents belonging to the following families of solvents:

aromatic hydrocarbons (apolar aprotic): benzene, toluene, ethylbenzene, xylene;

chlorinated hydrocarbons (polar aprotic): methylene chloride, chlorobenzene;

ethers such as diphenyl ether;

cyclic ethers (polar aprotic): tetrahydrofuran, dioxane;

esters (polar): ethyl acetate, cyclohexyl acetate;

ketones (polar): methyl ethyl ketone, cyclohexanone.

A chlorinated solvent may be used if it does not interact, or interacts only very slightly, with the compound (I), so as not to give interfering radicals.

The abovementioned organic solvents are particularly suitable when the monomers to be polymerized or copolymerized are acrylic monomers (methacrylates, acrylates, acrylonitrile) and vinylaromatic monomers such as styrene monomers.

In certain cases, in particular in the polymerization of n-butyl methacrylate and styrene, hexane and cyclohexane may be used, and in the polymerization of vinyl acetate and acrylonitrile, dimethylformamide, dimethyl sulphoxide, acetonitrile or acetone may be used.

In general, the polymerization or copolymerization process according to the invention takes place in an identical manner for the random homopolymerization and copolymerization. For the preparation of block copolymers, including star-shaped block copolymers, the experimental conditions may change during the addition of a monomer which is different from the first after the first monomer has been polymerized. For example, the temperature may be varied in either direction, it being possible for the second dose to be added with a solvent. For the preparation of macromonomers or of $\alpha,\omega$-functionalized polymers (telechelic polymers), the same type of variation in the experimental conditions may be envisaged.

As monomers which may be polymerized and copolymerized in the presence of the polymerization or copolymerization initiator system proposed, mention may be made of (meth)acrylic and vinyl (vinylaromatic, vinyl esters such as vinyl acetate, vinyl chloride and vinyl fluoride) monomers, as well as vinylidene (vinylidene fluoride) and diene monomers.

The initiator system according to the invention is also suitable for the (co)polymerization of optionally fluorinated olefin monomers, such as ethylene, butene, hexene and 1-octene.

For the purposes of the present invention, the term acrylic monomer is understood to refer to a monomer chosen from primary, secondary and tertiary alkyl acrylates in which the alkyl group, which may be substituted, for example, with at least one halogen atom such as fluorine, and/or at least one hydroxyl group, contains 1 to 18 carbon atoms, mention being made more particularly of ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate and isodecyl acrylate, as well as phenyl acrylate, isobornyl acrylate, alkylthioalkyl or alkoxyalkyl acrylates, acrylonitrile and dialkylacrylamides.

For the purposes of the present invention, the term methacrylic monomer is understood to refer to a monomer chosen from alkyl methacrylates in which the alkyl group, which may be substituted, for example, with at least one halogen atom such as fluorine and/or at least one hydroxyl group, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, decyl, β-hydroxyethyl, hydroxypropyl or hydroxybutyl methacrylate, as well as glycidyl methacrylate, norbornyl methacrylate, methacrylonitrile and dialkylmethacrylamides.

For the purposes of the present invention, the term vinylaromatic monomer is understood to refer to an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

The term diene monomer is understood to refer to a diene chosen from linear or cyclic, conjugated or non-conjugated dienes such as, for example, butadiene, 2,3- dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene and isopropylidenetetrahydroindene.

According to the invention, it has been observed that, by careful combination of a metal complex as defined above with a polymerization radical-generator compound, random and block homopolymers and copolymers that are fully defined and controlled may be obtained, as well as star-shaped copolymers and α,ω-functionalized (telechelic) macromonomers and polymers which it has not been possible hitherto to synthesize by standard radical polymerization processes.

The invention thus also relates to the polymers or copolymers as obtained by the abovementioned process, of controlled molecular masses and of narrow polydispersity.

The polymers and copolymers of (meth)acrylic and vinyl monomers as obtained by the process of the invention have molecular masses $\overline{Mn}$ of between 400 and 10,000,000 g/mol and a particularly narrow polydispersity $\overline{Mw}/\overline{Mn}$, which is less than 2, generally less than 1.5, being between 1.05 and 1.5. Within the context of radical polymerization, this constitutes important progress since until very recently, it was inconceivable to obtain molecular mass distributions or polydispersities $\overline{Mw}/\overline{Mn}$ of less than 1.5. Furthermore, the process of the invention is extremely regioselective, that is to say that it allows excellent control over the orientation of the monomer units during propagation. Moreover, the chains orient themselves exclusively head-to-tail and no longer head-to-head, as might have been the case in standard radical polymerization. This promotes the thermal stability of the polymers and copolymers thus prepared. The absence of termination reactions removes any other possibility of head-to-head alignment.

By comparison with the known processes of ionic and radical polymerization and copolymerization, the process of the present invention has the following advantages:

homogeneous and live polymerization. The polymerization is live according to the criteria generally put forward: linear change in the average masses as a function of the conversion, linear change in ln(1/(1-conversion)) as a function of time, resumption of the polymerization after addition of a fresh dose of monomer (Penczek, S. in *Makromol. Chem. Rapid. Commun.* 1991, 12, 77);

excellent molecular control: Mw/Mn narrow up to about Mw/Mn=1.1; good correlation between the theoretical Mn and the experimental Mn; possibility of preparing block copolymers, including star-shaped copolymers;

quantitative polymerization leading to total consumption of the monomer;

mild temperature conditions ranging from 0° C. to 130° C. and ordinary pressure;

the reaction time depends on the concentration of the reaction medium. This is because, the lower the concentration of monomer, the slower will be the polymerization kinetics;

compatibility in aqueous media since the catalysts used do not degrade in the presence of water. Possibility of emulsion and suspension polymerization, in the presence or absence of emulsifiers;

possibility of stereocontrol, that is to say of controlling the hetero-, syndio- or isotacticity by using chiral catalysts;

excellent control of the synthesis of the polymers or copolymers obtained, the molecular masses of which range between 400 and 10,000,000 g/mol;

the resistance to thermal degradation of the polymers and copolymers is improved on account of the absence of termination reactions (combinations and disproportionations) which may be shown in particular by thermogravimetric analysis;

production of novel products that are difficult to access by the usual polymerization techniques, such as pure block copolymers, defined random copolymers and hyper-branched polymers which can be used as adhesives of controlled formulation, shockproof additives, emulsifiers and interface agents;

production of materials with improved properties; the absence of terminal double bonds makes it possible to increase the depolymerization temperature of the polymers, in particular of PMMA;

controlled polymerization which makes it possible to avoid the auto-acceleration of the polymerization (known as the gel effect or Trommsdorf effect). The control of the polymerization by the copper complex makes it possible to avoid the sudden auto-acceleration of the polymerization after very rapid setting. This phenomenon is generally harmful for the manufacturer and the product. In particular, for PMMA which needs to be in the form of cast plates, it is important for the polymerization to be controlled in order to avoid the appearance of bubbles or defects at the surface of the plate. The gel point may be avoided by using suitable, sometimes long, temperature cycles. A single temperature is preferably used, which is a simplification for the process.

Non-limiting examples describing the preparation of polymers as obtained according to the process of the present invention are given below.

The experimental number-average molecular masses ($\overline{Mn}_{exp}$) are obtained by gel permeation chromatography (GPC) calibrated with monodispersed poly(methyl methacrylate) (PMMA) standards, except where otherwise mentioned. The theoretical number-average molecular masses ($\overline{Mn}_{theor}$) are calculated from the monomer/initiator molar ratio, corrected by the yield ($\overline{Mn}_{theor}$=([M]×yield))/([initiator]×100), [M] being the monomer concentration. The factor f is the initiation efficacy factor, i.e. $\overline{Mn}_{theor}/\overline{Mn}_{exp}$. The polydispersity index is $\overline{Mw}/\overline{Mn}$.

EXAMPLE 1

Bulk Polymerization of n-butyl Acrylate

The following are mixed in a 2-liter reactor fitted with a mechanical stirrer and maintained under a protective atmosphere of nitrogen:

200 g of n-butyl acrylate;
0.72 g of copper (I) bromide;
0.93 g of (1-bromoethyl)benzene $C_6H_5CHBrCH_3$; and 1.45 g of the ligand of formula (L1):

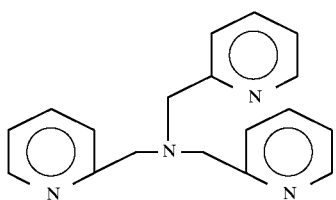

The mixture is brought to 120° C.

Samples are taken over time. This makes it possible to calculate the conversion into polymer obtained after evaporation under vacuum (25 mbar, 140° C., 20 minutes) of the monomer remaining in a sample.

The results are given in Table 1.

TABLE 1

| t (h) | Conversion (%) | $\overline{Mn}_{exp}$ (g/mol) | $\overline{Mw}/\overline{Mn}$ | ln (1/(1-conversion)) |
|---|---|---|---|---|
| 0 | 0 | 0 | 0 | 0 |
| 0.25 | 23 | 8,600 | 2.0 | 0.26 |
| 0.67 | 43 | 14,940 | 1.7 | 0.57 |
| 1.0 | 70 | 25,820 | 1.5 | 1.20 |
| 1.25 | 82 | 30,600* | 1.4 | 1.74 |

*Theoretical $\overline{Mn}$ = 32,800 g/mol

The linear change in the average masses $\overline{Mn}_{exp}$ as a function of the conversion, as well as in the ln(1/(1-conversion)) as a function of time, shows that the system is live (good control of the polymerization).

EXAMPLE 2

Bulk Polymerization of n-butyl Acrylate

The process is performed as in Example 1, but at 100° C. The results are given in Table 2.

TABLE 2

| t (h) | Conversion (%) | $\overline{Mn}_{exp}$ (g/mol) | $\overline{Mw}/\overline{Mn}$ |
|---|---|---|---|
| 0 | 0 | 0 | — |
| 0.25 | 41 | — | — |
| 0.75 | 52 | 16,300 | 1.6 |
| 1.25 | 74 | 20,070 | 2.0 |
| 2.75 | 86 | 27,000* | 1.7 |

*Theoretical $\overline{Mn}$ = 34,400 g/mol

It is observed that $\overline{Mn}$ varies linearly with the conversion.

EXAMPLE 3

Bulk Polymerization of Styrene

The process is performed as in Example 1, but the butyl acrylate is replaced by styrene (200 g) and the temperature is 80° C. The results are given in Table 3.

TABLE 3

| t (h) | Conversion (%) | $\overline{Mn}_{exp}$ (g/mol) | $\overline{Mw}/\overline{Mn}$ | ln (1/(1-conversion)) |
|---|---|---|---|---|
| 0 | 0 | 0 | — | 0 |
| 0.5 | 7.2 | — | — | 0.07 |
| 1.0 | 11.6 | — | — | 0.12 |

TABLE 3-continued

| t (h) | Conversion (%) | $\overline{Mn}_{exp}$ (g/mol) | $\overline{Mw}/\overline{Mn}$ | ln (1/(1-conversion)) |
|---|---|---|---|---|
| 3.75 | 31.8 | — | — | 0.38 |
| 4.25 | 31 | — | — | 0.37 |
| 4.83 | 36.2 | 24,860* | 1.3 | 0.45 |

*Theoretical $\overline{Mn}$ = 14,500 g/mol

The polydispersity index is less than 1.5, which is a sign of a controlled radical polymerization. Furthermore, the logarithm ln(1/(1-conversion)) varies linearly as a function of time.

EXAMPLE 4

Bulk Polymerization of Styrene

The process is performed as in Example 3, but copper (I) chloride is used in place of the copper (I) bromide and the chloride (1-chloroethyl)benzene ($C_6H_5CHClCH_3$) is used in place of $C_6H_5CHBrCH_3$.

After 37 hours, the polymerization is stopped and the polymer is recovered for analysis.

Conversion=77.5%

$\overline{Mn}_{exp}$=37,000 g/mol $\overline{Mn}_{theor}$=31,000 g/mol $\overline{Mw}/\overline{Mn}$=1.2.

There is very good agreement between the mass aimed at and the experimental mass. Furthermore, the polydispersity index is very low (less than 1.5), which is a sign of a controlled radical polymerization.

EXAMPLE 5 (COMPARATIVE)

Bulk Polymerization of n-butyl Acrylate

The following are mixed in a 2-liter reactor fitted with a mechanical stirrer and maintained under a protective atmosphere of nitrogen:

300 g of n-butyl acrylate;

1.43 g of (1-bromoethyl)benzene ($C_6H_5CHBrCH_3$);

3.30 g of copper bromide; and 3.55 g of bipyridine.

The polymerization temperature is 130° C.

After 5.5 hours, the polymerization is stopped and the polymer is recovered for analysis.

Conversion=91.2%

$\overline{Mn}_{exp}$=24,010 g/mol $\overline{Mn}_{theor}$=36,500 g/mol $\overline{Mw}/\overline{Mn}$=1.7.

The polydispersity index is greater than 1.5 here.

EXAMPLE 6

Solution Polymerization of n-butyl Acrylate

The following are mixed in a 2-liter reactor fitted with a mechanical stirrer and maintained under a protective atmosphere of nitrogen:

300 g of n-butyl acrylate diluted in 150 g of diphenyl ether;

1.08 g of copper (I) bromide;

1.02 g of dibromoxylene (para-$BrCH_2C_6H_4CH_2$-para-Br); and 2.18 g of the ligand L1 (cf. Example 1).

The mixture is brought to 100° C.

Samples are taken over time. This makes it possible to calculate the conversion into polymer obtained after evaporation under vacuum (25 mbar, 140° C., 20 minutes) of the monomer remaining in a sample.

The results are given in Table 4.

TABLE 4

| t (h) | Conversion (%) | $\overline{Mn}_{exp}$ (g/mol) | Mw/Mn | ln (1/(1-conversion)) |
|---|---|---|---|---|
| 0 | 0 | 0 | — | 0 |
| 0.50 | 43 | 34,930 | 1.3 | 0.56 |
| 1.83 | 82 | 57,200* | 1.5 | 1.71 |

*$\overline{Mn}_{theor}$ = 32,800 g/mol
Conversion = 82%

The linear change in the average masses $\overline{Mn}_{exp}$ as a function of the conversion, as well as in the ln(1/(1-conversion)) as a function of time, shows that the system is live (good control of the polymerization).

EXAMPLE 7 (COMPARATIVE)

Solution Polymerization of n-butyl Acrylate

The process is performed as in Example 6, but replacing the 2.18 g of (L1) by 3.55 g of bipyridine. The results are given in Table 5.

TABLE 5

| t (h) | Conversion (%) | $\overline{Mn}_{exp}$ (g/mol) | Mw/Mn | ln (1/(1-conversion)) |
|---|---|---|---|---|
| 0 | 0 | 0 | — | 0 |
| 0.5 | 2 | — | — | 0.02 |
| 1.0 | 5 | — | — | 0.05 |
| 3.0 | 11 | — | — | 0.12 |
| 4.0 | 14 | — | — | 0.15 |
| 5.83 | 49.5 | — | — | 0.10 |
| 23.08 | 61.3 | 41,900 | 1.4 | 0.95 |
| 24.50 | 66.8 | — | — | 1.10 |
| 27.00 | 70.6 | — | — | 1.22 |
| 28.0 | 67 | — | — | 1.11 |
| 29.83 | 71.6 | 46,500* | 1.4 | 1.26 |

*$\overline{Mn}_{theor}$ = 28,640 g/mol
Conversion = 71.6%.

With the bipyridine ligand, the rate of polymerization is slower than with the ligand (L1). This is because it takes 1.83 h to arrive at an 82% conversion with the ligand (L1), but it takes 29.83 h to arrive at a 71.6% conversion with the bipyridine ligand.

EXAMPLE 8

Bulk Polymerization of Styrene

The following are introduced into a 250 cm³ reactor degassed beforehand with argon and fitted with a mechanical stirrer:

93 g of styrene;
0.414 g (2.23×10⁻³ mol) of (1-bromoethyl)benzene ($C_6H_5CHBrCH_3$);
0.221 g (2.23×10⁻³ mol) of copper (I) chloride; and
0.771 g (3.3×10⁻³ mol) of the ligand of formula (L2):

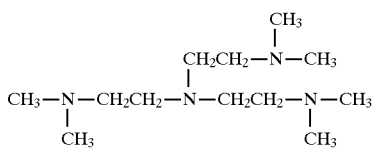

The polymerization starts when the reaction mixture is brought to the desired temperature, i.e. 110° C. here. By taking samples over time, it is possible to calculate the conversion into polymer.

The results are given in Table 6.

TABLE 6

| t (min.) | Conversion (%) | $\overline{Mn}_{theor}$ (g/mol) | $\overline{Mn}_{exp}$ (g/mol) | Mw/Mn |
|---|---|---|---|---|
| 40 | 10.4 | 4340 | 4860 | 1.38 |
| 80 | 16 | 6670 | 7100 | 1.53 |
| 110 | 21 | 8760 | 9830 | 1.51 |
| 140 | 25 | 10420 | 12730 | 1.47 |
| 200 | 35 | 14600 | 17170 | 1.36 |
| 260 | 46 | 19200 | 21150 | 1.37 |
| 350 | 55 | 22950 | 25330 | 1.30 |
| 380 | 63 | 26300 | 27130 | 1.36 |

$\overline{Mn}_{theor}$ = 26,300 g/mol
$\overline{Mn}_{exp}$ = 27,130 g/mol
Conversion = 63%.

The polydispersity indices are particularly low, and the $\overline{Mn}_{exp}$ varies linearly with the conversion, which are signs of a controlled polymerization.

EXEMPLE 9

Bulk Polymerization of Styrene

The process is performed as in Example 8, but with:
102.8 g of styrene;
0.244 g of copper (I) chloride;
0.457 g of (1-bromoethyl)benzene ($C_6H_5CHBrCH_3$);
0.85 g of ligand (L2) (cf. Example 8); and
a temperature of 120° C.

The results are given in Table 7.

TABLE 7

| t (min.) | Conversion (%) | $\overline{Mn}_{theor}$ (g/mol) | $\overline{Mn}_{exp}$ (g/mol) | Mw/Mn |
|---|---|---|---|---|
| 15 | 14.8 | 6160 | 6930 | 1.33 |
| 30 | 20.2 | 8400 | 9720 | 1.36 |
| 60 | 27.8 | 11560 | 17280 | 1.25 |
| 80 | 41.1 | 17100 | 20501 | 1.33 |
| 130 | 60.2 | 25040 | 30630 | 1.33 |
| 140 | 63.9 | 26580 | 33250 | 1.30 |
| 175 | 74.4 | 30950 | 36480 | 1.41 |

$\overline{Mn}_{theor}$ = 30,960 g/mol
$\overline{Mn}_{exp}$ = 36,480 g/mol
Conversion = 74.4%.

The polydispersity indices are particularly low, and the $\overline{Mn}_{exp}$ varies linearly with the conversion, which are signs of a controlled polymerization.

EXAMPLE 10

Bulk Polymerization of Styrene

Half of the styrene which is to be polymerized (1.5 g) is introduced into a previously degassed Schlenck tube stirred with a magnetic bar, followed by the copper (I) chloride ($7.14 \times 10^{-3}$ g) and (1-bromoethyl)benzene ($C_6H_5CHBrCH_3$) ($1.33 \times 10^{-2}$ g). A solution containing the rest of the styrene (1.5 g) to be polymerized and the ligand (L2) (cf. Example 8) is then added. The Schlenck tube is placed in an oil bath brought to 80° C., and the temperature of the oil is then brought to 110° C.

When the polymerization stops by setting, the contents of the Schlenck tube are dissolved in toluene and then filtered through paper. Some of the toluene is then removed and the viscous mixture obtained is precipitated from methanol. The precipitated polystyrene is then dried and weighed.
Duration: 4h30
T: 110° C.
Mass of polymer recovered: 2.52 g
Conversion: 99%
$\overline{Mn}_{exp}$=59,000 g/mol
$\overline{Mn}_{theor}$=41,200 g/mol
$\overline{Mw}/\overline{Mn}$=1.27.

It is noted that the polydispersity index is very low, less than 1.5, which is a sign of a controlled radical polymerization

EXAMPLE 11

Bulk Polymerization of Polystyrene

The conditions of Example 10 are repeated, but at 100° C.
Duration: 48h
Mass of polymer recovered: 2.11 g
Conversion: 93%
$\overline{Mn}_{exp}$=43,882 g/mol
$\overline{Mn}_{theor}$=38,700 g/mol
$\overline{Mw}/\overline{Mn}$=1.43.

It is noted that the polydispersity index is very low, less than 1.5, which is a sign of a controlled radical polymerization.

EXAMPLE 12

Bulk Polymerization of Styrene

The process is performed as in Example 8, but with:
104 g of styrene;
0.481 g of (1-bromoethyl)benzene ($C_6H_5CHBrCH_3$);
0.257 g of ligand (L3):

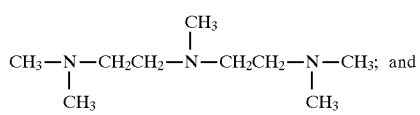

a temperature of 120° C.
The results are given in Table 8.

TABLE 8

| t (min.) | Conversion (%) | $\overline{Mn}_{theor}$ (g/mol) | $\overline{Mn}_{exp}$ (g/mol) | $\overline{Mw}/\overline{Mn}$ |
|---|---|---|---|---|
| 85 | 16.5 | 6,600 | 6,100 | 1.4 |
| 175 | 32 | 12,800 | 11,600 | 1.3 |
| 230 | 41.8 | 16,700 | 14,300 | 1.3 |
| 280 | 49.7 | 19,900 | 15,700 | 1.3 |
| 465 | 66 | 26,400 | 23,300 | 1.2 |
| 510 | 77.2 | 31,000 | 25,700 | 1.3 |

The polydispersity indices are low (<1.5) and the $\overline{Mn}_{exp}$ varies linearly with the conversion, which are signs of a controlled polymerization.

EXAMPLE 13

Bulk Polymerization of Styrene

The process is performed as in Example 8, but with:
104 g of styrene;
0.481 g of (1-bromoethyl)benzene ($C_6H_5CHBrCH_3$);
0.257 g of cuprous chloride;
1.119 g of ligand (L4):

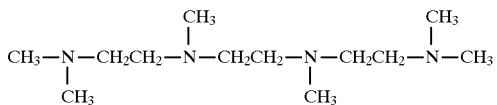

temperature of 120° C.
The results are given in Table 9.

TABLE 9

| t (min.) | Conversion (%) | $\overline{Mn}_{theor}$ (g/mol) | $\overline{Mn}_{exp}$ (g/mol) | $\overline{Mw}/\overline{Mn}$ |
|---|---|---|---|---|
| 30 | 22.2 | 8,900 | 8,500 | 1.4 |
| 60 | 30 | 12,000 | 12,000 | 1.3 |
| 90 | 41.7 | 16,700 | 15,700 | 1.2 |
| 130 | 59.3 | 23,700 | 24,200 | 1.2 |
| 160 | 74.3 | 29,700 | 31,700 | 1.3 |

The polydispersity indices are low (<1.5) and the $\overline{Mn}_{exp}$ varies linearly with the conversion, which are signs of a controlled polymerization.

The preceding examples can be repeated with similar success by substituting the generically or specifically described reactants and/or operating conditions of this invention for those used in the preceding examples.

The entire disclosure of all applications, patents and publications, cited above, and of corresponding French application 96/16049, are hereby incorporated by reference.

From the foregoing description, one skilled in the art can easily ascertain the essential characteristics of this invention, and without departing from the spirit and scope thereof, can make various changes and modification of the invention to adapt it to various usages and conditions.

We claim:

1. A process for the controlled radical polymerization or copolymerization of (meth)acrylic and/or vinyl and/or vinylidene and/or diene monomers, characterized in that least one of the said monomers is polymerized or copolymerized in bulk, solution, emulsion or suspension at in the presence of an initiator system comprising:
   at least one radical-generator compound; and
   at least one catalyst consisting essentially of a metal complex represented by formula (I) below:

$$MA_a(L)_n \qquad (I)$$

in which:
M represents Cu, Ag or Au;
A represents a halogen, a pseudohalogen or a carboxylate group;
the groups L are ligands of the metal M which are chosen independently from those represented by formula (II) below:

in which:
Y represents N or P;
$R^1$, $R^2$, $R^3$, $R^4$, $R^5$ and $R^6$ each independently represent a hydrogen atom, a $C_1$–$C_{10}$ alkyl group, an aromatic group or a heteroaromatic group;

$Z^1$, $Z^2$ and $Z^3$ each independently represent one of the following:

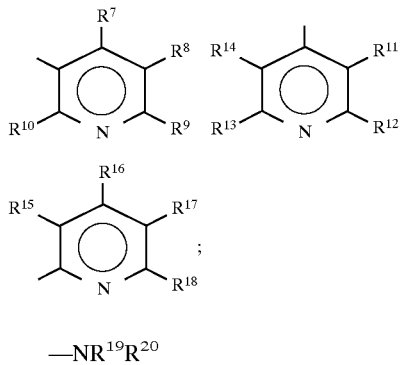

—$NR^{19}R^{20}$ where:
the radicals $R^7$ to $R^{18}$ each independently represent a hydrogen atom, a $C_1$–$C_{10}$ alkyl group, an aromatic group or a heteroaromatic group; and
$R^{19}$ and $R^{20}$ each independently represent a hydrogen atom, a halogen atom, a $C_1$–$C_{10}$ alkyl radical, a $C_1$–$C_{10}$ alkoxy radical or a radical —$(CR^{21}R^{22})_rNR^{23}R^{24}$, where $R^{21}$, $R^{22}$, $R^{23}$ and $R^{24}$ each independently represent a hydrogen atom, a $C_1$–$C_{10}$ alkyl group, an aromatic group or a heteroaromatic group, and r is an integer from 1 to 10;
it being also possible for not more than two from among $Z^1$, $Z^2$ and $Z^3$ each to represent a hydrogen atom;
o, p and q each independently represent an integer from 1 to 10, and may also represent 0 except if the associated residue $Z^1$, $Z^2$ or $Z^3$, respectively, represents —$NR^{19}R^{20}$;
a is 1 or 2;
n is 1, 2 or 3.

2. A process according to claim 1, characterized in that M represents Cu.

3. A process according to claim 1, characterized in that A represents a halogen chosen from Cl, Br, F and I, or a pseudohalogen chosen from CN, NCS, $NO_2$ and $N_3$, or a carboxylate group such as acetate.

4. A process according to claim 1, characterized in that the ligands L are selected from the group consisting of formula:

(IIa)

wherein $R^{25}$, $R^{26}$ and $R^{27}$ represent hydrogen or methyl, with the following provisos;
when $R^{25}$ represents hydrogen, $R^{26}$ and $R^{27}$ represent hydrogen or methyl; and
when $R^{25}$ represents methyl, $R^{26}$ and $R^{27}$ represent methyl;

and the compound of formulae:

$$CH_3-N(CH_3)-CH_2CH_2-N(CH_2CH_2-N(CH_3)CH_3)-CH_2CH_2-N(CH_3)CH_3;$$

$$CH_3-N(CH_3)-CH_2CH_2-N(CH_3)-CH_2CH_2-N(CH_3)CH_3; \text{ and}$$

$$CH_3-N(CH_3)-CH_2CH_2-N(CH_3)-CH_2CH_2-N(CH_3)-CH_2CH_2-N(CH_3)CH_3$$

5. A process according to claim 1, characterized in that the complex of formula (I) is formed in situ in the reaction medium from the salt of the transition metal M with A and from the polydentate ligand L.

6. A process according to claim 1, characterized in that the free-radical-generator compound is monofunctional and chosen from the following classes of compounds:

(a) derivatives of formula:

$$CEZ_3$$

where:
E=Cl, Br, I, F, H, —$CR^{28}R^{29}OH$, $R^{28}$ and $R^{29}$ each independently representing hydrogen or $C_1$–$C_{14}$ alkyl; and
Z=Cl or Br, (b) derivatives of formula:

$$R^{30}CCl_3$$

where $R^{30}$ represents phenyl; benzyl; benzoyl; alkoxycarbonyl; $R^{31}CO$ with $R^{31}$ representing $C_1$–$C_{14}$ alkyl or aryl; alkyl; mesityl; trifluoromethyl; or nitro, (c) derivatives of formula:

$$Q-\underset{R^{33}}{\overset{R^{32}}{C}}-T$$

in which:
Q represents a chlorine or bromine atom or an acetate or trifluoroacetate or triflate group;
$R^{32}$ represents a hydrogen atom, a $C_1$–$C_{14}$ alkyl group or an aromatic group or a —$CH_2OH$ group;
T represents a group $$-\underset{O}{\overset{\parallel}{C}}-O-R^{34},$$

with $R^{34}$ representing hydrogen or an alkyl or aromatic group; a CN group; a group $$-\underset{O}{\overset{\parallel}{C}}-R^{35},$$

with $R^{35}$ representing $C_1$–$C_{14}$ alkyl, phenyl or isocyanate; a hydroxyl group; a nitro group; a substituted or unsubstituted amino group; a $C_1$–$C_{14}$ alkoxy group; a group $R^{36}CO$, with $R^{36}$ representing $C_1$–$C_{14}$ alkyl or aryl;

$R^{33}$ represents a group falling within the definitions of $R^{32}$ or of Q or a functional group such as hydroxyl, nitro, substituted or unsubstituted amino, $C_1-C_{14}$ alkoxy, acyl, carboxylic acid, ester;

(d) α-halo lactone or lactam compounds;
(e) N-halosuccinimides, and N-halophthalimides;
(f) alkylsulphonyl halides and arenesulphonyl halides;
(g) compounds of formula:

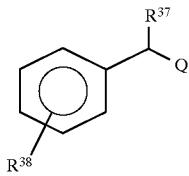

where:
$R^{37}$ represents a hydrogen atom, a $C_1-C_{14}$ alkyl group or a carboxylic acid, ester, nitrile or ketone group;
$R^{38}$ represents a hydrogen atom or a $C_1-C_{14}$ alkyl, hydroxyl, acyl, substituted or unsubstituted amine, nitro, $C_1-C_{14}$ alkoxy or sulphonate group; and
Q has the meaning given above;

(h) compounds of formula:

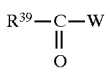

where:
$R^{39}$ represents $C_1-C_{14}$ alkyl or aryl;
W represents halogen or pseudohalogen;

(i) compounds of formula:

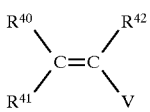

where
$R^{40}$, $R^{41}$ and $R^{42}$ each independently represent $C_1-C_{14}$ alkyl or aryl; and
V represents halogen, acetate, trifluoroacetate or triflate;

(j) aromatic halides of formula:

where:
Ar represents an aromatic group such as $C_6H_5-$ which may be substituted in the ortho, meta or para position with an electron-withdrawing or electron-donating group, and
U represents a halogen.

7. A process according to claim 1, characterized in that the radical-generator compound is multifunctional and comprises at least two monofunctional radical-generator groups derived from classes (c) to (j), connected by a chain of methylene units or by a benzene ring or by a combination of the two, or is chosen from acetic anhydrides such as chloroacetic anhydride and chlorodifluoroacetic anhydride, and tri- or tetrahalomethanes and trichloromethyl derivatives of classes (a) and (b).

8. A process according to claim 1, characterized in that the radical-generator compound is a radical initiator chosen from azo compounds, 2,2'-azobis(2-methyl)propanenitrile (AIBN), 1,1'-azobis(1-cyclohexanenitrile) and 4,4'-azobis (4-cyanovaleric acid); peroxy compounds, diacyl peroxides, dibenzoyl peroxide and didodecanoyl peroxide; dialkyl peroxides, di-tert-butyl peroxide and diisopropyl peroxide; dicumyl peroxide; peroxy-dicarbonates; peresters tert-butyl peracetate, tert-amyl perpivalate, butyl per-2-ethylhexanoate, tert-butyl perpivalate and tert-butyl perbenzoate; hydroperoxides tert-butyl hydroperoxide; inorganic peroxides aqueous hydrogen peroxide solution; and sodium or potassium persulphate.

9. A process according to claim 1, characterized in that the polymerization is carried out in the presence of at least one activator.

10. A process according to claim 1, characterized in that the molar ratio of the monomer or monomers to the radical-generator compound or compounds is from 1 to 100,000.

11. A process according to claim 1, characterized in that the molar ratio of the metal M to the radical-generator(s) is from 0.01 to 100.

12. A process according to claim 6, characterized in that the molar ratio L:M is between 0.1 and 10, preferably between 0.5 and 2.

13. A process according to claim 1, characterized in that the polymerization or copolymerization is carried out at a temperature of from 0° C. to 130° C.

14. A process according to claim 1, characterized in that the polymerizable or copolymerizable monomers comprise at least one monomer chosen from methacrylates, acrylates, vinylaromatic derivatives, vinyl acetate, vinyl chloride, vinyl fluoride and vinylidene fluoride.

15. A process according to claim 14, characterized in that the monomer is chosen from the group comprising methyl methacrylate, ethyl methacrylate, n-butyl methacrylate, acrylonitrile and styrene.

16. A process according to claim 1, characterized in that a block copolymerization is carried out by introducing, into the polymerization medium in which the first monomer has been polymerized, a second monomer with, where appropriate, a fresh addition of initiator system.

17. A process according to claim 1, characterized in that the (co)polymerization is carried out in aqueous medium, in the presence or absence of emulsifiers, in the presence of an organic solvent, or a mixture of organic solvents, aromatic hydrocarbons, chlorinated hydrocarbons, ethers, cyclic ethers and ketones.

18. A process according to claim 9, wherein the activator is a Lewis acid.

19. A process according to claim 1, wherein the polymerization is bulk polymerization of n-butyl acrylate or styrene.

20. A process according to claim 19, wherein L is

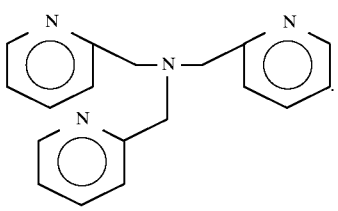

* * * * *